United States Patent [19]

Zody

[11] Patent Number: 5,352,057
[45] Date of Patent: Oct. 4, 1994

[54] ADJUSTMENT TOOL FOR TELESCOPING MEMBERS

[76] Inventor: Charles R. Zody, 554 Melissa Dr., Oxford, Ohio 45056

[21] Appl. No.: 998,185

[22] Filed: Dec. 28, 1992

[51] Int. Cl.⁵ .......................... F16B 7/00; A63B 5/00
[52] U.S. Cl. ..................................... 403/109; 403/83; 403/19; 403/20; 403/321; 482/17
[58] Field of Search ............... 403/376, 377, 378, 379, 403/109, 83, 321, 19, 20; 482/16, 17

[56] References Cited

U.S. PATENT DOCUMENTS

| | | |
|---|---|---|
| 1,414,110 | 4/1922 | Bocchio ............................. 403/109 |
| 4,056,115 | 11/1977 | Thomas . |
| 4,577,877 | 3/1986 | Kassai . |
| 4,611,418 | 9/1986 | Launder . |
| 4,639,026 | 1/1987 | Smallegan . |
| 4,712,830 | 12/1987 | Charbrol et al. . |
| 4,761,092 | 8/1988 | Nakatani . |
| 4,834,413 | 5/1989 | Patel et al. . |

*Primary Examiner*—Randolph A. Reese
*Assistant Examiner*—Anthony Knight
*Attorney, Agent, or Firm*—Frost & Jacobs

[57] ABSTRACT

A release key for adjustable track hurdles having telescoping members with a biased detent locking assembly located within a pair of longitudinal telescoping members, wherein the detent extends outwardly through aligned apertures in the telescoping members to selectively lock those members in predetermined longitudinal positions. The key features a pressure plate having inner and outer faces, with the inner face having an inwardly extending release protuberance and shaped portion which corresponds in conformation with at least a portion of the outer surface of the telescoping members. The outer face preferably includes a handle to further facilitate manipulation by the user, and the release protuberance is aligned with the biased detent in use and extends at least partially into the aligned apertures when its inner face is placed in contact with the outer surface of the telescoping members. In a preferred embodiment, the key includes a pair of release protuberances longitudinally spaced along the inner face of the pressure plate at intervals corresponding with spacing between adjustment apertures on the hurdle standards to enable quick adjustment of hurdle heights between predetermined, non-adjacent adjustment apertures. The release key also preferably includes a curved pressure plate having a semicircular shape to correspond with the cylindrical outer tube of hurdle standards, and the handle includes a rounded thumb clasp designed to receive the user's thumb and to enable simultaneous release of the locking pin and grasping of the outer circumference of the adjustable hurdle standard.

12 Claims, 2 Drawing Sheets

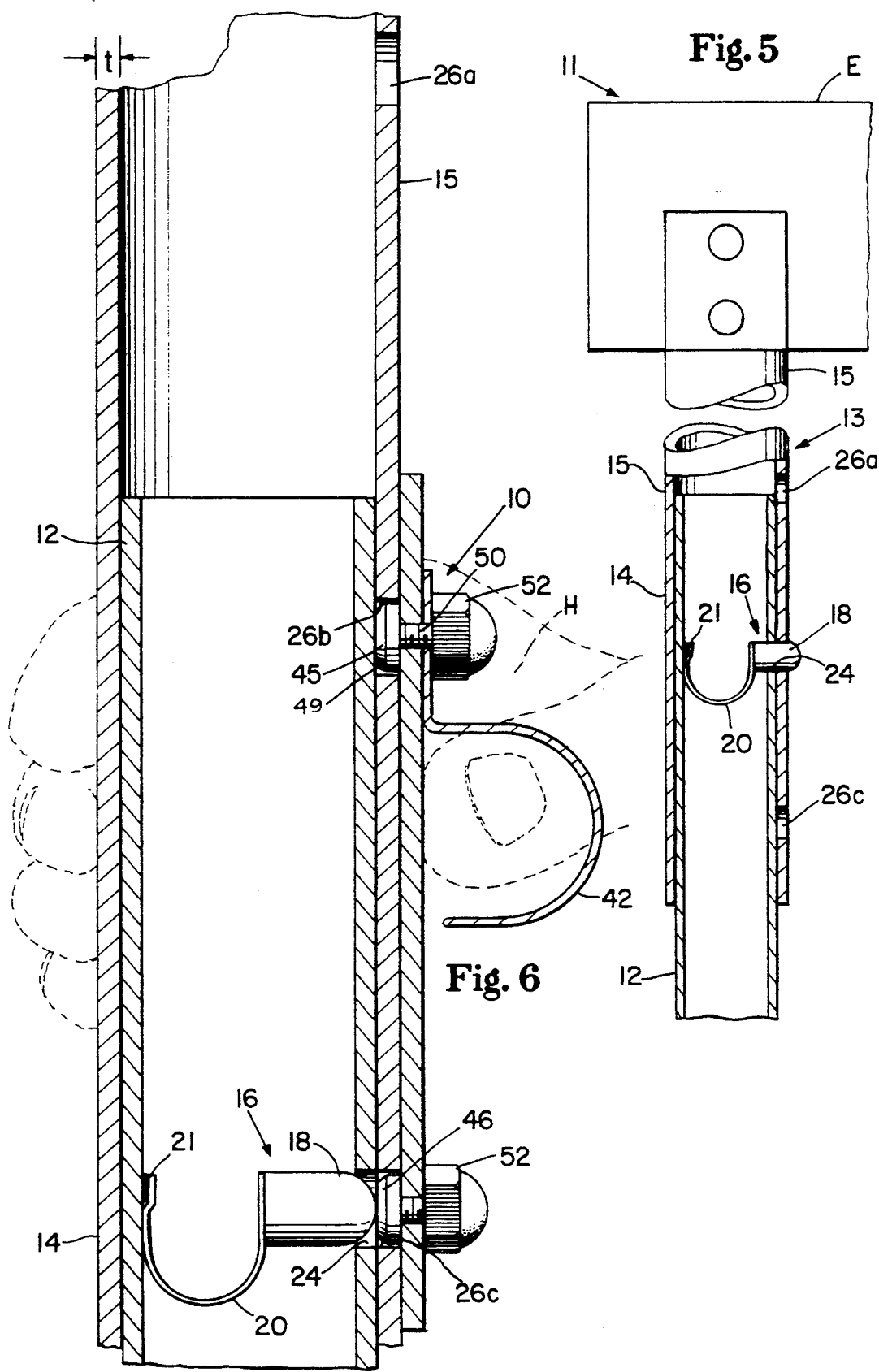

ADJUSTMENT TOOL FOR TELESCOPING MEMBERS

TECHNICAL FIELD

This invention pertains to an adjustment tool for telescoping members of track hurdle standards and the like which have a biased detent locking assembly which extends outwardly through aligned apertures in the telescoping members in locked position, and which must be depressed inwardly to enable longitudinal adjustment of the members, and, more particularly, to a release tool for quick adjustment of the telescoping legs of track hurdles and characterized by a pressure plate having an inner face with one or more inwardly extending release protuberances, and an outer face including a handle for facilitating use and manipulation.

BACKGROUND ART

There are many devices which have adjustable legs, tension members, or other support structures including a pair of extension members telescopingly arranged for longitudinal adjustment between one or more predetermined locking positions. Often a biased detent locking assembly is situated within the innermost telescoping member and arranged to automatically extend outwardly through aligned apertures in the telescoping members to lock the same in a predetermined longitudinal position. Examples of such telescopic arrangements include collapsible tent poles, legs on folding chairs, and the vertical standards on track hurdles and similar devices. Generally, in order to adjust these telescoping members, one must depress the outwardly biased detent locking member inwardly to release the outer telescoped member from locked condition with the inner member. Anyone who has had the opportunity to experience and use apparatuses including telescoping members of this type has no doubt also experienced the tendency of such biased locking assemblies to pinch fingers, and, sometimes, to cause abrasions or cuts on fingers or thumbs used to depress the locking member.

Track hurdles are a prime example of such telescoping longitudinal members having a biased detent locking assembly therewithin. It is very common for track hurdles to feature a variety of predetermined vertical heights, such as thirty, thirty-three, thirty-six, thirty-nine and/or forty-two inches, in order to accommodate different races and different age groups and sexes of competitors. For example, at collegiate men's track meets, the hurdles are first set at the forty-two inch height for the first hurdle race in the meet (usually the high hurdle race). Following that race, the hurdles must be lowered to their thirty-six inch height for the next race, which is often relatively soon after the high hurdle race. Consequently, the hurdles must be quickly adjusted by the crew members, which has heretofore required the manual depressing of the spring-loaded pins extending outwardly through aligned apertures in the telescoping members of the hurdle standards. Because the outwardly biased detent or pin automatically pops outwardly for locking engagement as the telescoping members are adjusted to the next (i.e., thirty-nine inch) height, the crew member will again have to depress the pin in order to continue the adjustment procedure down to thirty-six inches. As can be appreciated, these manual operations can take their toll on the hands and fingers of the crew members.

While there have been a number of adapters, release handles, and other arrangements provided for various telescoping arrangements with spring-loaded pushbutton locking members, heretofore there has not been available a release tool for telescoping members of track hurdle standards and the like which is independent of the telescoping assembly itself and which can be conveniently used to adjust a number of independent telescoping member assemblies. For example, an adapter for manipulating spring-loaded pushbutton is shown in U.S. Pat. No. 4,056,115 which issued to M. Thomas. The Thomas structure requires a collar force-fit into position around the outer tubular telescoping member, a plunger having a domed head, and a pressure plate at the outside end of the plunger for contact with the hand of the user.

Similarly, a lock releasing arrangement for a telescoping tubular leg is shown in U.S. Pat. No. 4,761,092, which issued to K. Nakatani. The Nakatani telescoping members are illustrated as being generally rectangular in nature, and a U-shaped mounting bracket is dimensioned to fit around the outer leg section. The bracket is held against removal from the leg section by a camming lever attached by a pivotal shaft for movement between locking and release positions. The camming lever creates a friction lock for holding the telescoped legs in a desired position. U.S. Pat. No. 4,834,413, which issued N. Patel et al., shows a similar quick release handle for patient aid and invalid care devices. The handle includes a collar which extends around the periphery of the outer tube of a pair of telescoped members, and rotation of the collar cams a series of detents either inwardly or outwardly for selectively depressing a spring-biased detent which projects through aligned apertures of the telescopically received tubes.

Other release tool arrangements have been provided for a wide variety of applications including spring biased locking members, from excavation equipment tooling to folding chairs and the like. However, heretofore, there has not been provided a relatively simple release tool for adjustable telescoping members having a biased detent locking assembly, and which was conveniently applicable by a user in the form of an independent release tool for application to a number of separate devices such as track hurdles or the like.

DISCLOSURE OF THE INVENTION

It is an object of this invention to provide a relatively simple release tool for telescoping members which addresses and obviates the above-described problems and shortcomings of previously available devices with telescoping members having a biased detent locking assembly such as track hurdles and the like.

It is another object of the present invention to provide a release tool which is particularly adapted for use in quickly adjusting the height of the telescoping standards of track hurdles and similar devices.

It is yet another object of the present invention to provide a release key for track hurdles which can selectively provide the ability to quickly adjust track hurdles between a variety of hurdle heights.

It is also an object of the present invention to provide a release tool for track hurdles which includes spaced apart release members which enable a single motion adjustment of the track standard between predetermined, and non-adjacent heights in a convenient one-step process.

In accordance with one aspect of the present invention, there is provided a release tool for adjustable telescoping members having a biased detent locking assembly located within a pair of longitudinal telescoping members, wherein the detent extends outwardly through aligned apertures in the telescoping members to selectively lock those members in predetermined longitudinal positions. The release tool is characterized by a combination including a pressure plate having inner and outer faces, with the inner face having an inwardly extending release protuberance and shaped portion which corresponds in conformation with at least a portion of the outer surface of the telescoping members. The outer face of the tool preferably includes a handle to further facilitate manipulation by the user, and the release protuberance is aligned with the biased detent in use and extends at least partially into the aligned apertures when its inner face is placed in contact with the outer surface of the telescoping members.

In a preferred embodiment, the release tool includes a pair of release protuberances longitudinally spaced along the inner face of the pressure plate to enable quick adjustment of the hurdle heights between predetermined, non-adjacent adjustment apertures. As described herein, the release tool also preferably includes a curved pressure plate having a semicircular shape to correspond with the cylindrical outer tube of hurdle standards, and the handle includes a rounded thumb clasp designed to receive the users' thumb and to enable simultaneous release of the locking pin and grasping of the outer circumference of the adjustable hurdle standard.

BRIEF DESCRIPTION OF THE DRAWINGS

While the specification concludes with claims particularly pointing out and distinctly claiming the present invention, it is believed the same will be better understood from the following description taken in conjunction with the accompanying drawings in which:

FIG. 1 is a rear elevational view of an adjustment tool made in accordance with the present invention for telescoping members of track hurdle standards and the like;

FIG. 5 is a partial cross-sectional view of an exemplary track hurdle standard with adjustable tubular telescoping members and a biased detent locking assembly; and FIG. 6 is a partial cross-sectional view of adjustable telescoping members illustrating the tool of the present invention in adjustment position.

DETAILED DESCRIPTION OF THE INVENTION

Figure 1:
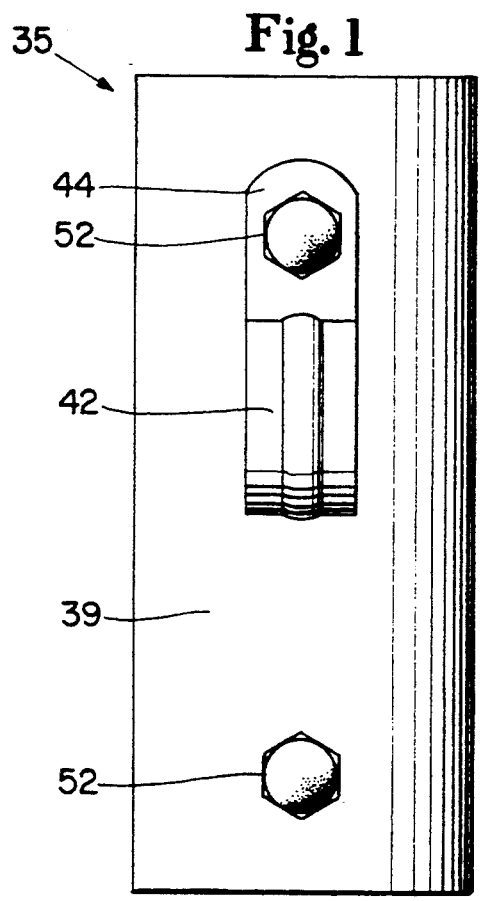

Referring now to the drawings in detail, wherein like numerals indicate the same elements throughout the views, FIG. 1 is a rear elevational view of a detent release and adjustment tool 10 made in accordance with the present invention. As will be understood, adjustment tool 10 is designed for use with telescoping members (e.g., inner telescoping member 12 and outer telescoping member 14) of an adjustable standard 13 of a track hurdle 11 (e.g., hurdle 11 illustrated in FIG. 5).

While the present release tool can clearly be utilized for a variety of applications having telescoping members and outwardly biased detent locking assembly, a preferred use of adjustment tool 10 will be described in conjunction with adjustable track hurdles and the like. As illustrated in FIGS. 5 and 6, hurdle standard 13 commonly includes an outer surface 15 having a generally tubular conformation, shown in the illustrations as being substantially cylindrical (although it is contemplated that such conformation could be any of a variety of tubular conformations). Biased detent locking assembly 16 is illustrated as including detent pin 18 and biasing member 20 which can be anchored to the inner surface of telescoping member 12, such as by an attachment tie 21 (e.g. a weld, rivet, adhesive bond, etc.).

Figure 4:
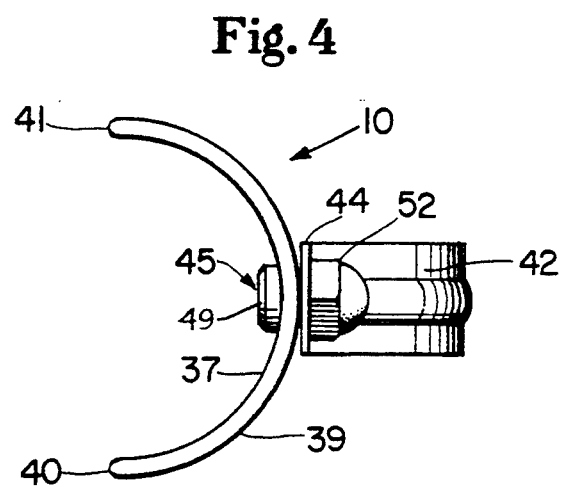
FIG. 4 is a top plan view of the tool of FIG. 1.
Figure 3:
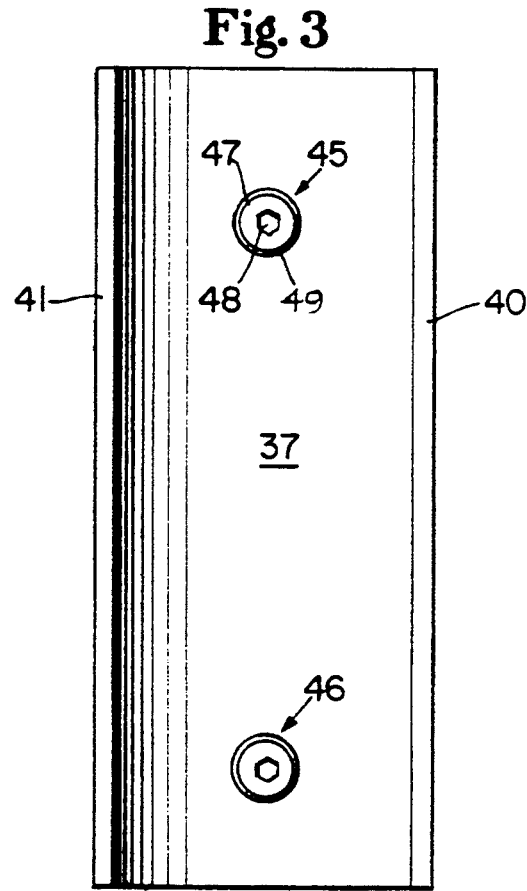
FIG. 3 is a front elevational view of the tool of FIG. 1.

With reference to FIGS. 1–4, detent release and adjustment tool 10 is illustrated as including a pressure plate 35 generally shaped to conform to the outer surface 15 of the telescoping assembly 13. Particularly, at least a portion of the inner face 37 of pressure plate 35 will preferably have a shape complimentary to the outer surface (e.g., 15) of the telescoping members with which release key 10 is to be used. Where the track hurdle standard or other telescoping member assembly includes a cylindrical outer conformation, it is preferred that at least the central portions of inner face 37 exhibit a corresponding semi-cylindrical shape, generally less than half of a full cylinder, as best seen in FIG. 4. While most track hurdle standards are provided with substantially cylindrical outer surfaces of standard dimensions (e.g., an outer diameter of approximately 1⅝", or approximately 40 cm), it may be desirable to provide inner face 37 with a variable conformation to more readily adapt release key 10 to a wide variety of shapes and sizes of telescoping members in substantially face-to-face contact in use.

Outer face 39 of pressure plate 35 will preferably be provided with a means (e.g., handle 42) for facilitating tactile manipulation of tool 10 by a user. Particularly, handle 42 is illustrated in FIGS. 1, 2, 4 and 6 as comprising a thumb clasp designed to conveniently accommodate the user's thumb, while freeing the balance of the user's hand and fingers for wrapping around outer face 39 and a portion of outer telescoping member 14 during adjustment procedures. Particularly, a user's hand H is illustrated in phantom in FIG. 6 to demonstrate a preferred manner of grasping tool 10 against the outer surface of outer telescoping member 14. Inner face 37 meets outer face 39 along the oppositely disposed longitudinal edges 40 and 41, respectively.

Figure 2:
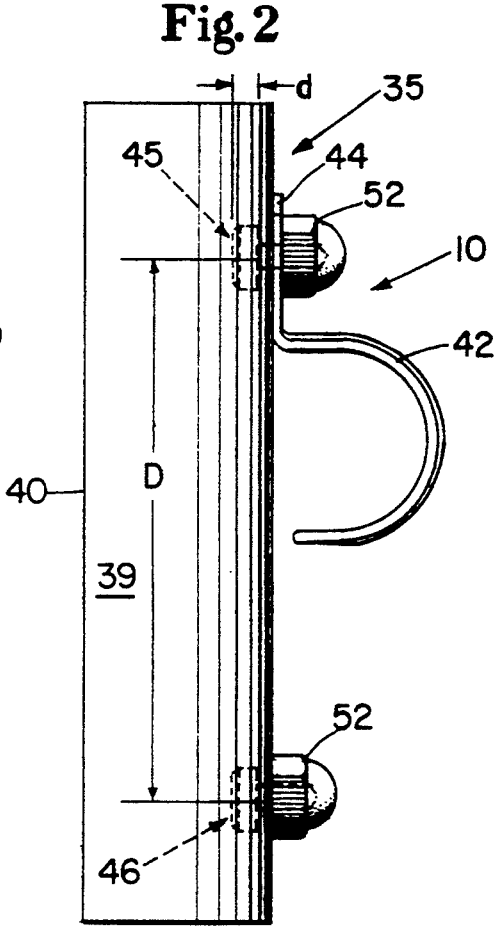
FIG. 2 is a right side elevational view of the adjustment tool of FIG. 1.

As best seen in FIG. 2, handle 42 preferably includes an attachment flange 44 for connection to outer face 39 in any convenient manner. At least one release nub/protuberance 45 will be provided on inner face 37, and will extend inwardly therefrom a predetermined distance d. While distance d may be varied between specific applications, it will generally correspond with the thickness t of the outer telescoping member (14), as best shown in FIG. 6.

As will be understood, protuberance 45 is intended to contact detent pin 18 of biased detent locking assembly 16 to effectively release its locking engagement when adjustment is desired. In order to best facilitate longitudinal adjustment of outer telescoping member 14 relative to inner member 12, it is preferred that release nub 45 not extend inwardly beyond the inner surface of outer member 14 for obvious reasons. As shown in the drawings, it is also preferred that each release nub 45 include a beveled edge or chamfer 49 adjacent its inwardly extending distal surface to facilitate alignment and insertion of nub 45 into a locking aperture (e.g. 26) of a telescoping member.

In a preferred embodiment, handle 42 will be attached to pressure plate 35 via a rounded machine bolt 47 having a threaded shank 50 for threaded interaction with the cap nut 52. In this way, a rounded machine bolt or the like can effectively provide both the required release protuberance 45 and the means for attaching handle 42 to the pressure plate. Machine bolt 47 might further be provided with an allen wrench opening (e.g., 48) to facilitate tightening in threaded engagement with cap nut 52, and may be slightly countersunk into inner face 37 of plate 35 to ensure inward extension of nub 45 at the proper distance d.

In a preferred embodiment, a plurality of release nubs or protuberances (e.g., 45 and 46) may be provided in longitudinally spaced relationship along the inner face 37. Particularly, where it is desirable to provide a tool which can facilitate adjustment of telescoping members (e.g., 12 and 14) between predetermined longitudinal heights, it may be most efficient to provide at least a pair of protuberances spaced at a predetermined distance D to appropriately interact with a pair of spaced height adjustment openings formed in telescoping member 14 (e.g., openings 26 b and c shown in FIG. 6) to facilitate single motion adjustment between non-adjacent adjustment positions. As used herein, the term "non-adjacent" shall be used to describe the situation where adjustment is desired between a first height adjustment opening (e.g., opening 26c and a second opening (e.g., 26a) which is not immediately adjacent to the first opening.

As seen best in FIG. 6, release protuberance 46 acts to depress locking pin 18 inwardly to its unlocked position, wherein longitudinal adjustment of member 14 relative to member 12 can be accomplished. However, if outer member 14 is thereafter moved in a downward direction, locking pin 18 inwardly would automatically extend through the next subsequent height adjustment opening (e.g., 26b), except for the fact that second protuberance 45 prevents that locking action. Consequently, movement can continue until the next adjacent height adjustment opening (i.e., 26a) is aligned with locking aperture 24, whereupon locking pin 18 will extend outwardly into its locking condition and prevent further longitudinal adjustment. By providing a plurality of release protuberances (e.g., 45 and 46) longitudinally spaced at a predetermined distance corresponding with one or more adjacent height adjustment openings (e.g., 26a-c) of outer telescoping member 14, tool 10 can be utilized to facilitate quick and convenient one-step adjustments between non-adjacent heights. In this way, the upper edge E of hurdle 11 can be quickly adjusted between standard race heights (e.g., between high hurdle 42" height and low hurdle 36" height) in a single motion.

As will be appreciated, a pair of adjustment tools 10 can be simultaneously utilized by a single user to most expeditiously adjust the height of a track hurdle. Particularly, the user would place a release key 10 over each thumb in a manner similar to that illustrated in FIG. 6, and would align a release protuberance (e.g., 45 or 46) of each key or tool 10 with the locking pin 18 of the locking assembly 16 on the inside of each of the hurdle standards 13. The user would then push each of the tools against the outer surface (e.g., 15) of each of the respective standards, forcing the inner face 37 of each tool into face-to-face contact with the outer surface 15 of each of the standards. Such pressure will cause detent pin 18 of each of the standards to be depressed and released from locking condition. The user would at the same time grasp the release tool 10 and a portion of the outer telescoping member 14 in a manner similar to that shown in FIG. 6, raising or lowering the respective outer telescoping members 14 to a desired hurdle height once the detent pins have been depressed.

As indicated above, if adjustments between non-adjacent heights is desired, a tool having at least a pair of spaced release protuberances (e.g., 45 and 46) could be best utilized to enable single motion adjustment between non-adjacent predetermined heights. It is also contemplated that a tool 10 having two or more release protuberances could also be used to utilized to adjust the telescoping members between adjacent height adjustment openings by "cocking" the tool enough that its second protuberance (which might otherwise prevent the locking pin from snapping into locking position with the desired adjustment opening 26) does not interfere with the movement of detent pin 18. Preferably, however, the user will simply apply tool 10 such that the extra release protuberance (i.e., the one not used to release detent pin 18) is aligned in a height adjustment opening spaced away from the intended direction of adjustment movement of the hurdle standards. In this way, it will be understood that the additional release protuberance(s) will not interfere with the desired adjustment procedures.

The adjustment tool of the present invention might alternatively be provided with selectively activated release protuberances (not shown), wherein one or more of the auxiliary release protuberances could be selectively moved between inwardly extending position (as shown in the drawings herein) and a non-activated position (i.e., not extending inwardly from inner face 37).

Having shown and described the preferred embodiments of the present invention, further adaptions of the adjustment tool of telescoping members of the present invention can be accomplished by appropriate modifications by one of ordinary skill in the art without departing from the scope of the present invention. Several of these potential modifications have been mentioned, and others will be apparent to those skilled in the art. For example, the material from which release tool 10 is fabricated is not critical, and can comprise a lightweight metal, plastic, fiber, or other sufficiently rigid material. Similarly, while the thumb clasp arrangement of handle 42 is shown as a preferred example, other means of facilitating tactile manipulation of the present tool (e.g., a strap retainer, ergonomic handle, or the like) could similarly be substituted as appropriate.

Accordingly, the scope of the present invention should be considered in terms of the following claims and is understood not to be limited to the details of structure and operation shown and described in the specification and drawings.

I claim:

1. An independent, hand held release tool for adjustable telescoping members having a biased detent locking assembly located within a pair of longitudinal telescoping members, wherein said detent extends outwardly through aligned apertures in the telescoping members toward an outer surface thereof to selectively lock such telescoping members in a predetermined longitudinal position, said release tool characterized by the combination of a pressure plate having inner and outer faces, said inner face having a release protuberance extending inwardly therefrom a predetermined fixed distance, and a shaped portion which corresponds in conformation with at least a portion of the outer surface of said telescoping members to enable substantially face-to-face contact therebetween, said outer face comprising a handle for enabling tactile manipulation by the user, said pressure plate, along with its release protuberance, and said handle being fixedly attached to form a single assembly having no moving parts, and wherein said release protuberance is aligned with said detent in use and extends at least partially into said aligned apertures when said inner face is placed in contact with said outer surface of said telescoping members to force the detent inwardly during release and adjustment procedures.

2. The release tool of claim 1, further comprising a pair of release protuberances longitudinally spaced along said inner face of said pressure plate.

3. The release tool of claim 1, wherein said shaped portion of said inner face is provided in the form of a curved pressure plate.

4. The release tool of claim 1, further comprising a plurality of release protuberances longitudinally spaced along the inner face of said pressure plate, said protuberances spaced at, predetermined intervals to substantially correspond with the respective space between longitudinally spaced locking apertures on said telescoping members, whereby adjustment of said telescoping members between predetermined spaced locking positions is automatically enabled.

5. An independent, hand held release key for adjustable telescoping members of track hurdles having a biased detent locking assembly located within a pair of longitudinal telescoping members, wherein said detent extends outwardly through aligned apertures in the telescoping members to an outer surface thereof to selectively lock such telescoping members at one of a plurality of predetermined longitudinal positions determined by location of adjustment openings in the outer telescoping members, said release tool characterized by its combination of a pressure plate having inner and outer faces, said inner face having a plurality of release protuberances extending inwardly therefrom a predetermined fixed distance and a shaped portion which corresponds in conformation with at least a portion of the outer surface of said telescoping members to enable substantially face-to-face contact therebetween, said outer face comprising a handle for enabling tactile manipulation by the user, said pressure plate, along with its release protuberance, and said handle being fixedly attached to form a single assembly having no moving parts, and wherein at least one of said release protuberances is aligned with said detent and extends at least partially into said aligned apertures when said inner face is placed in contact with said outer surface of said telescoping members to release the detent for adjustment procedures.

6. The release tool of claim 5, comprising a pair of release protuberances longitudinally spaced along said inner face of said pressure plate.

7. The release tool of claim 5, wherein said shaped portion of said inner face is provided in the form of a curved pressure plate.

8. The release tool of claim 5, wherein said protuberances are spaced at predetermined intervals corresponding with the space between adjustment openings on the outer telescoping member, whereby adjustment of said telescoping members between predetermined, non-adjacent spaced locking positions is automatically enabled.

9. A release tool for adjustable telescoping members having a biased detent locking assembly located within a pair of longitudinal telescoping members, wherein said detent extends outwardly through aligned apertures in the telescoping members toward an outer surface thereof to selectively lock such telescoping members in a predetermined longitudinal position, said release tool characterized by the combination of a pressure plate having inner and outer faces, said inner face having an inwardly extending release protuberance and a shaped portion which corresponds in conformation with at least a portion of the outer surface of said telescoping members to enable substantially face-to-face contact therebetween, said shaped portion provided in the form of a curved pressure plate having a semicircular shape less than half of a full cylinder, said outer face comprising a handle for enabling tactile manipulation by the user, and wherein said release protuberance is aligned with said detent in use and extends at least partially into said aligned apertures when said inner face is placed in contact with said outer surface of said telescoping members to force the detent inwardly during release and adjustment procedures.

10. A release tool for adjustable telescoping members having a biased detent locking assembly located within a pair of longitudinal telescoping members, wherein said detent extends outwardly through aligned apertures in the telescoping members toward an outer surface thereof to selectively lock such telescoping members in a predetermined longitudinal position, said release tool characterized by the combination of a pressure plate having inner and outer faces, said inner face having an inwardly extending release protuberance and a shaped portion which corresponds in conformation with at least a portion of the outer surface of said telescoping members to enable substantially face-to-face contact therebetween, said outer face comprising a handle for enabling tactile manipulation by the user, said handle comprising a rounded thumb clasp designed to receive the thumb of a user, and wherein said release protuberance is aligned with said detent in use and extends at least partially into said aligned apertures when said inner face is placed in contact with said outer surface of said telescoping members to force the detent inwardly during release and adjustment procedures.

11. A release key for adjustable telescoping members of track hurdles having a biased detent locking assembly located within a pair of longitudinal telescoping members, wherein said detent extends outwardly through aligned apertures in the telescoping members to an outer surface thereof to selectively lock such telescoping members at one of a plurality of predetermined longitudinal positions determined by location of adjustment openings in the outer telescoping members, said release tool characterized by its combination of a pressure plate having inner and outer faces, said inner face having a plurality of inwardly extending release protuberances and a shaped portion provided in the form of a curved, semicircular shape less than half of a full cylinder and which corresponds in conformation with at least a portion of the outer surface of said telescoping members to enable substantially face-to-face contact therebetween, said outer face comprising a handle for enabling tactile manipulation by the user, and wherein at least one of said release protuberances is aligned with said detent and extends at least partially into said aligned apertures when said inner face is placed in contact with said outer surface of said telescoping members to release the detent for adjustment procedures.

12. A release key for adjustable telescoping members of track hurdles having a biased detent locking assembly located within a pair of longitudinal telescoping members, wherein said detent extends outwardly through aligned apertures in the telescoping members to an outer surface thereof to selectively lock such telescoping members at one of a plurality of predetermined longitudinal positions determined by location of adjustment openings in the outer telescoping members, said release tool characterized by its combination of a pressure plate having inner and outer faces, said inner face having a plurality of inwardly extending release protuberances and a shaped portion which corresponds in conformation with at least a portion of the outer surface of said telescoping members to enable substantially face-to-face contact therebetween, said outer face comprising a handle for enabling tactile manipulation by the user, said handle comprising a rounded thumb clasp designed to receive the thumb of a user, and wherein at least one of said release protuberances is aligned with said detent and extends at least partially into said aligned apertures when said inner face is placed in contact with said outer surface of said telescoping members to release the detent for adjustment procedures.

* * * * *